(12) United States Patent
Van Meurs et al.

(10) Patent No.: US 10,039,261 B2
(45) Date of Patent: *Aug. 7, 2018

(54) DEVICE FOR REMOVING MANURE FROM A FLOOR, IN PARTICULAR A CLOSED FLOOR

(71) Applicant: LELY PATENT N.V., Maassluis (NL)

(72) Inventors: Matthew Van Meurs, Spijkenisse (NL); Roelof Stapel, Lelystad (NL); Jan Martinus Van Kuilenburg, Wadenoyen (NL); Karel Van Den Berg, Bleskensgraaf (NL); Jan Lambertus Pastoor, Rijswijk (NL)

(73) Assignee: LELY PATENT N.V., Maassluis (NL)

( * ) Notice: Subject to any disclaimer, the term of this patent is extended or adjusted under 35 U.S.C. 154(b) by 167 days.

This patent is subject to a terminal disclaimer.

(21) Appl. No.: 14/751,188

(22) Filed: Jun. 26, 2015

(65) Prior Publication Data

US 2015/0289472 A1 Oct. 15, 2015

Related U.S. Application Data

(60) Division of application No. 13/211,342, filed on Aug. 17, 2011, now Pat. No. 9,095,116, which is a (Continued)

(30) Foreign Application Priority Data

Feb. 17, 2009 (NL) ...................................... 1036581

(51) Int. Cl.
*A01K 1/01* (2006.01)
*A01K 1/00* (2006.01)

(52) U.S. Cl.
CPC .......... *A01K 1/0128* (2013.01); *A01K 1/0029* (2013.01); *A01K 1/01* (2013.01)

(58) Field of Classification Search
CPC ...... A01K 1/0128; A01K 1/0029; A01K 1/01; A47L 11/4069; A47L 11/4041; A47L 11/4058; A47L 11/4075
See application file for complete search history.

(56) References Cited

U.S. PATENT DOCUMENTS 2,556,592 A * 6/1951 Markkula ............ A01K 1/0128
  37/445
2,966,256 A * 12/1960 McLeland ................ A01K 1/01
  104/244

(Continued)

FOREIGN PATENT DOCUMENTS

DE 1531776 A1 9/1969
DE 4425924 A1 1/1996
(Continued)

OTHER PUBLICATIONS

Search Report for priority document NL1036581 dated Sep. 16, 2009.

(Continued)

*Primary Examiner* — Robert Scruggs
(74) *Attorney, Agent, or Firm* — Birch, Stewart, Kolasch & Birch, LLP

(57) ABSTRACT

The present invention relates to an unmanned self-propelled and self-steering device for removing manure present on a floor, including a manure slide and a drive for moving the device over the floor, wherein the manure slide is substantially U-shaped or V-shaped with two legs in order to define autonomously a manure-accommodating-space which opens in a forward direction and is closed in a rearward direction, and wherein the legs have a length in the order of magnitude of the width of the manure slide.

23 Claims, 7 Drawing Sheets

Related U.S. Application Data continuation of application No. PCT/NL2010/000025, filed on Feb. 12, 2010.

(56) References Cited

U.S. PATENT DOCUMENTS

| | | | |
|---|---|---|---|
| 4,968,878 | A | 11/1990 | Pong et al. |
| 5,309,592 | A | 5/1994 | Hiratsuka |
| 7,032,682 | B2 | 4/2006 | Van den Berg |
| 7,401,575 | B2* | 7/2008 | Waybright ........... A01K 1/0132 119/451 |
| 8,820,267 | B2* | 9/2014 | Stapel ................. A01K 1/0128 119/451 |
| 9,095,116 | B2* | 8/2015 | Van Meurs ............. A01K 1/01 |
| 2006/0081385 | A1* | 4/2006 | Huber .................... A01B 31/00 172/684.5 |
| 2008/0276408 | A1 | 11/2008 | Gilbert, Jr. et al. |

FOREIGN PATENT DOCUMENTS

| | | |
|---|---|---|
| DE | 10309106 A1 | 9/2004 |
| DE | 202006007378 U1 | 7/2006 |
| DE | 202007014840 U1 | 3/2008 |
| DE | 102007020328 A1 | 11/2008 |
| EP | 0943235 A2 | 9/1999 |
| EP | 1175827 A1 | 1/2002 |
| EP | 1371285 A1 | 12/2003 |
| EP | 1690450 A1 | 8/2006 |
| ES | 2216703 A1 | 10/2004 |
| JP | 2007/011857 * | 1/2007 |
| JP | 2007011857 A | 1/2007 |
| NL | 1011350 C | 8/2000 |
| WO | 0048455 A1 | 8/2000 |
| WO | 0070935 A1 | 11/2000 |
| WO | 0070937 A1 | 11/2000 |
| WO | 0070938 A1 | 11/2000 |
| WO | WO 00/70941 A1 | 11/2000 |

OTHER PUBLICATIONS

International Search Report for PCT/NL2010/000025 dated Jun. 30, 2010.

International Preliminary Report on Patentability for PCT/NL2010/000025 dated Aug. 23, 2011.

* cited by examiner

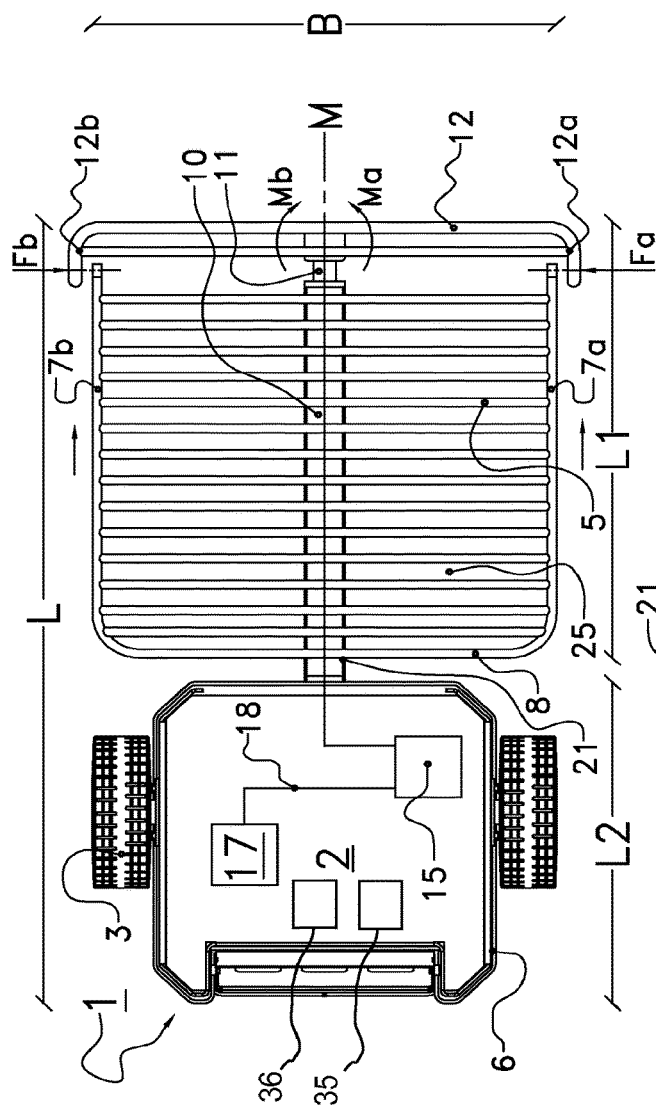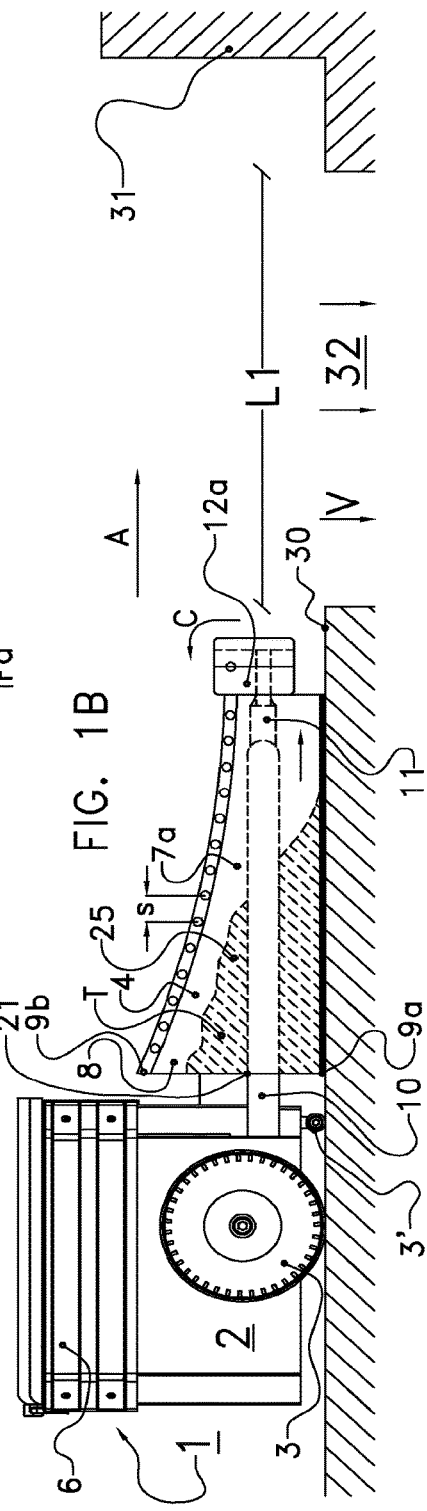

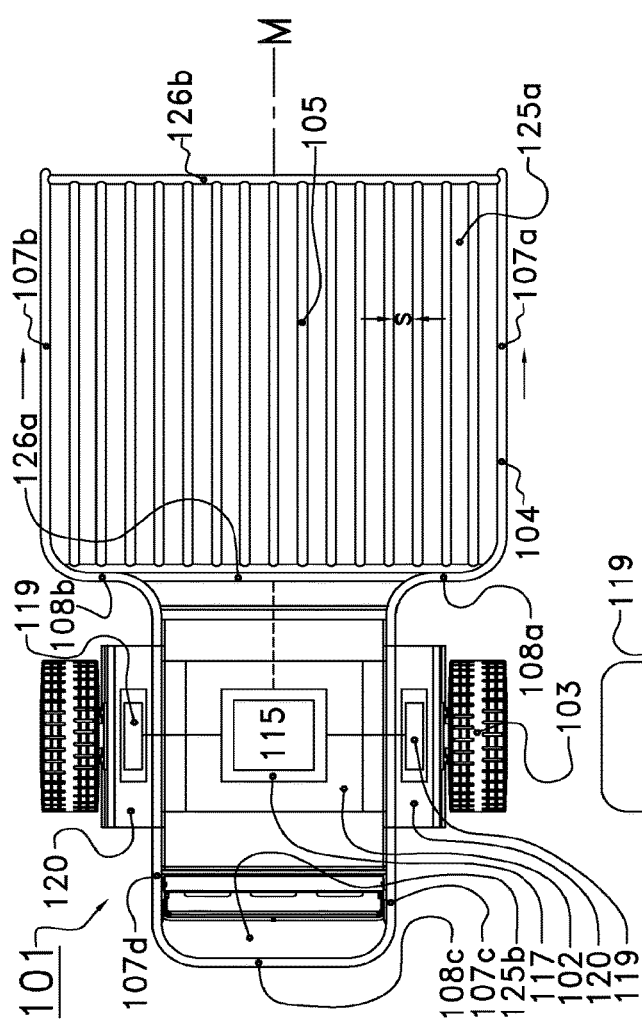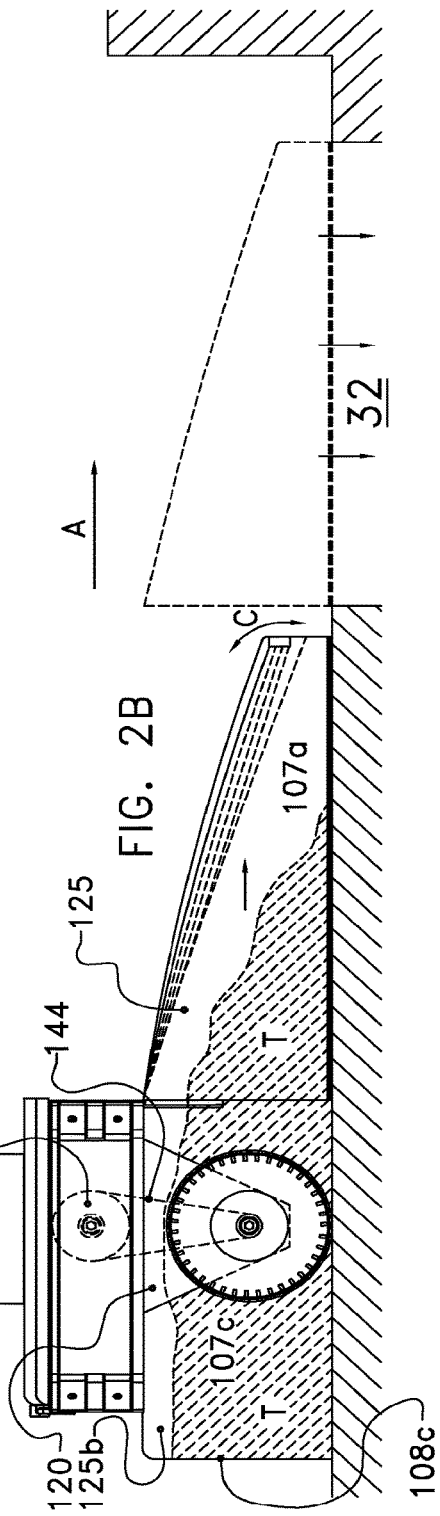

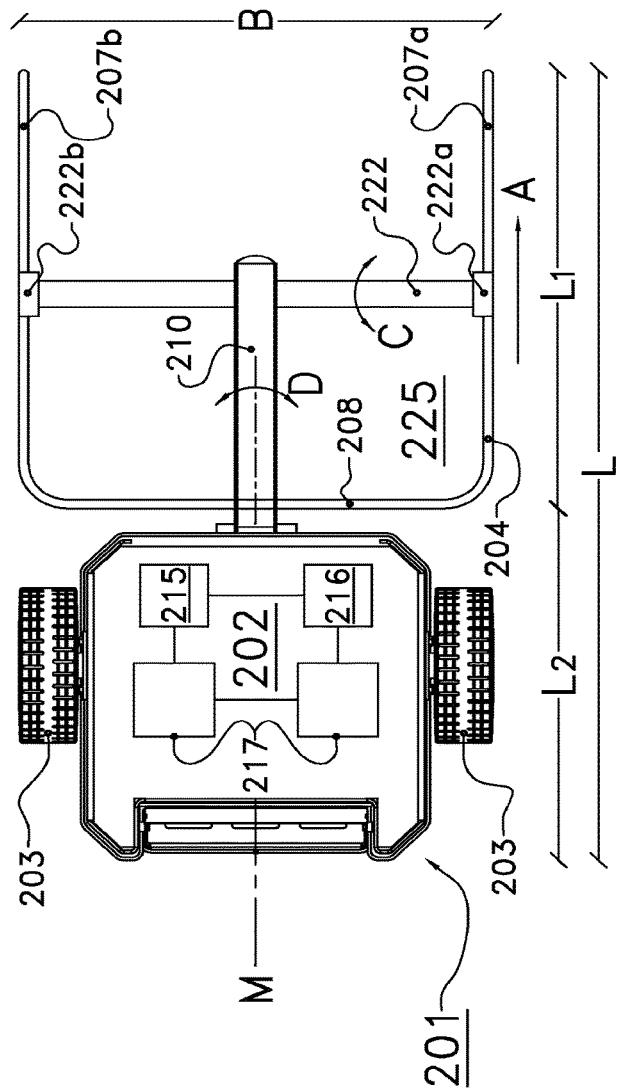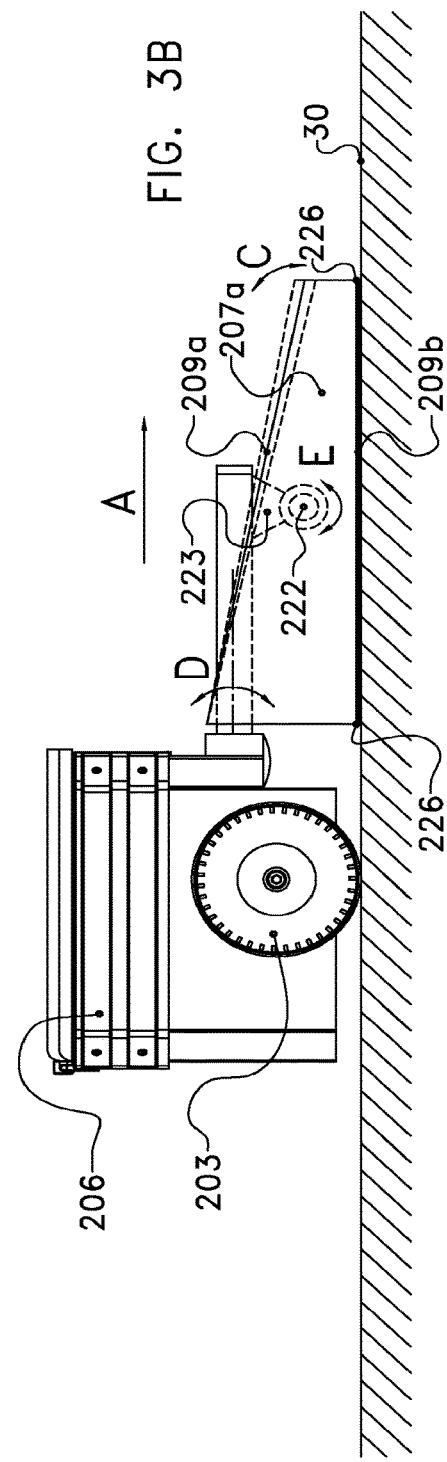

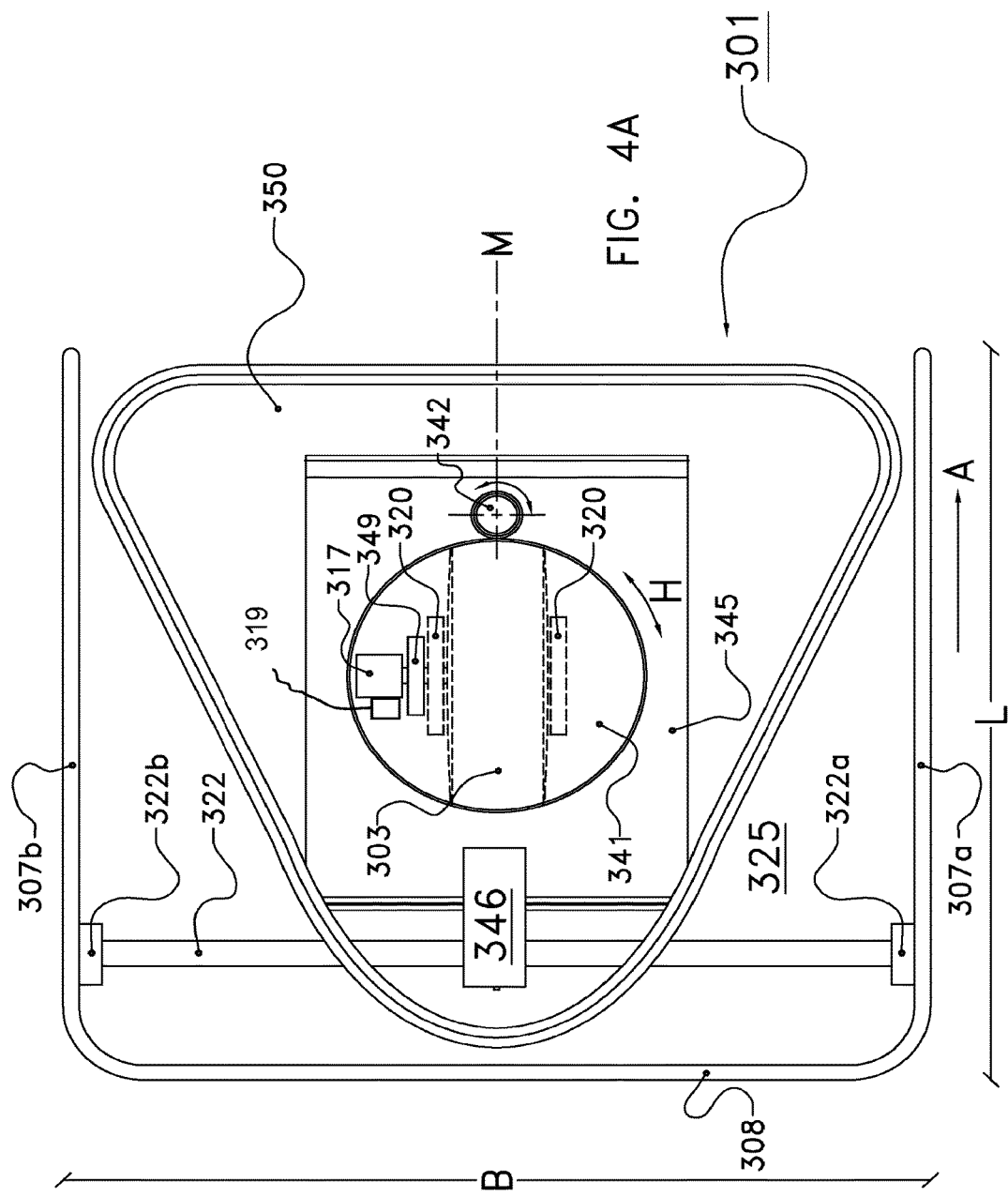

DEVICE FOR REMOVING MANURE FROM A FLOOR, IN PARTICULAR A CLOSED FLOOR

CROSS REFERENCE TO RELATED APPLICATIONS

This application is a divisional of U.S. patent application Ser. No. 13/211,342 filed on 17 Aug. 2011, which is a continuation of PCT application number PCT/NL2010/000025 filed on 12 Feb. 2010, which claims priority from NL patent application number 1036581 filed on 17 Feb. 2009. All three applications are hereby incorporated by reference in their entireties.

BACKGROUND OF THE INVENTION

1. Field of the Invention

The invention relates to a device for removing manure present on a floor, in particular a non-permeable floor, also called a closed floor. The invention relates in particular to such a device which is self-propelled and self-steering, and which is additionally displaceable in transverse direction of a passageway in a stable.

2. Description of the Related Art

DE 103 09 106, which is hereby incorporated by reference in its entirety, shows a trolley with a manure slide to be driven and controlled by a person which has taken his position on the device, having two sliding or scraping walls which are able to define a U-shape which is open in forward direction. By means of the two sliding or scraping walls, manure present on the floor is scraped to transverse slots of the floor in order to subsequently drop into them.

DE 20 2006 007378, which is hereby incorporated by reference in its entirety, shows a front attachment for a trolley, which front attachment is designed as a trapezium-shaped manure slide for a stable floor which is provided with transverse slots.

WO 00/70937 and WO 00/70938, which are hereby incorporated by reference in their entireties, show unmanned self-propelled and self-steering trolleys with a manure slide for stable floors provided with transverse slots.

EP 1.690.450 which is hereby incorporated by reference in its entirety, shows an unmanned self-propelled and self-steering trolley with a concave manure slide.

Another example of an unmanned self-propelled manure slide, which is guided over a longitudinal slot in a passageway in a stable is known from EP 1.175.827, which is hereby incorporated by reference in its entirety.

The known manure slides (also called manure scrapers) are configured to collect the manure in an area between successive transverse slots and to deposit same into the next transverse slot.

BRIEF SUMMARY OF THE INVENTION

In order to overcome one or more of the aforementioned disadvantages, the present invention provides an unmanned self-propelled and self-steering device, by means of which it is possible to remove manure present on a closed stable floor.

In one embodiment, the device is an unmanned self-propelled and self-steering device, which occupies only a limited space.

In another embodiment, the device is an unmanned self-propelled and self-steering device, which has a sufficient manoeuvrability.

In accordance with various aspects of the present invention, the unmanned self-propelled and self-steering device for removing manure present on a floor comprises a manure slide and a drive for moving the device over the floor, wherein the manure slide defines autonomously a manure-accommodating-space which opens in forward direction and is closed in rearward direction, and the manure slide is substantially U-shaped or V-shaped with two legs which have a length in the order of magnitude of the width of the manure slide.

Without increasing the width with respect to known, above described unmanned self-propelled and self-steering devices, it is possible for the device according to the invention to have a manure-accommodating-space which has sufficient capacity to take along all manure which is, within the transverse range of the manure slide, present on the floor of, for example, a passageway in a stable, in one displacement from one end of the passageway to the other end thereof. The manure collected can then be delivered by pushing it to the manure pit which is usually located at the inner end of the passageway. In a next operating stroke, the next path of the passageway can be cleaned by scraping.

It is observed that ES 2 216 703, which is hereby incorporated by reference in its entirety, shows an unmanned self-propelled manure slide which is guided over a longitudinal slot in a passageway of a stable and which is provided at its transverse ends with swivable lateral portions which are able to swing out until they abut boards of the passageway of the stable. The counterforce exerted by the boards is required for the formation of a U-shaped accommodation space. The manure slide, which remains centred by the guide means, has to extend in this situation over the overall width of the passageway, as a result of which the cattle may be hindered.

The legs can have a length which is greater than half, preferably greater than ⅔, of the overall length of the device.

The largest dimension of the accommodation space in longitudinal direction of the device can amount to the order of magnitude of the width of the manure slide.

In one embodiment, the ends of the legs extend to at least near the front of the device.

The drive can be located completely behind the manure slide, so that the whole contents of the accommodation space can be delivered to a pit entrance at the end of a passageway.

In an embodiment in which the space available within the device is used in an efficient manner, the drive completely coincides in horizontal direction with the manure-accommodating-space, when viewed in projection on a vertical central longitudinal plane, and on a vertical plane transverse thereto.

In another embodiment, the drive comprises two drive members located at the lateral sides of the device, wherein the manure-accommodating-space extends up to between the two drive members.

In both cases, the manure-accommodating-space can even extend in rearward direction to the rear side of the device.

In one embodiment, in which the device comprises a frame which is provided with the drive, and the manure slide is held by the frame by means of a connection structure, the connection structure, as known per se from EP 1.690.450, which is hereby incorporated by reference in its entirety, can comprise a first rotational connection with a first, substantially horizontal rotational centre line, for adjustment to local changes in the floor profile.

According to the invention, that centre line can be located below at least a portion of the upper edge of a manure-pushing wall portion of the manure slide. There is thus obtained a low point of rotation, so that negative effects on the contact of the manure slide to the floor as a result of moments generated by floor friction can be limited. Substantially horizontal for the first rotational centre line also relates to rotational centre lines which are at a small angle to the horizontal, such as for example an angle of approximately 20 degrees.

In such an arrangement, the connection structure can comprise a second rotational connection with a second, substantially horizontal rotational centre line which is at an angle, of preferably approximately 90 degrees, to the first rotational centre line, so that adjustment to local changes in a direction transverse thereto is improved. The second rotational centre line is preferably also below at least a portion of the upper edge of a manure-pushing wall portion of the manure slide, so that the contact of the manure slide to the floor can be improved.

The first rotational centre line can be transverse to a vertical central longitudinal plane of the device. The second rotational centre line can then be located in that plane.

If the first rotational centre line is transverse to the central longitudinal plane, it can be located in front of the manure-pushing wall portion of the manure-accommodating-space, in particular, when viewed in projection on a vertical central longitudinal plane of the device, coinciding in horizontal direction with the manure-accommodating-space, so that a compact arrangement is achieved.

According to another aspect of the present invention, the unmanned self-propelled and self-steering device for removing manure present on a floor, comprises a manure slide and a drive for moving the device over the floor, wherein the manure slide is substantially U-shaped or V-shaped with two legs in order to define a manure-accommodating-space which opens in forward direction, wherein the legs of the manure slide are plate-shaped and the manure slide is provided with means for enabling a mutual rotation of at least a portion of the lower edges of the legs in a vertical plane in which the relevant portion is located. In other words, the manure slide is configured to mutually rotate at least a portion of the lower edges of the legs. This results in an improved contact of the lower edge of the manure slide to the surface of the floor.

In one embodiment, the legs of the manure slide are deformable in their plane. One of ordinary skill in the art will appreciate that any suitable legs deformable in their plane can be used and modified for the instant invention. This is possible, for example, by means of an internal hinge by means of which the legs are connected to the rest of the manure slide. Constructive measures for this purpose have also been taken in the legs of the manure slide.

In another embodiment, the manure slide comprises a rear wall which is deformable about a centre line transverse to a central longitudinal plane of the manure slide, which results in a form of torsion enabling one leg to move upwards and the other leg to move downwards individually or simultaneously with the first one.

EP 1.690.450, which is incorporated by reference in its entirety, shows an unmanned self-propelled and self-steering trolley with manure slide (scraper) and two parallel, individually drivable drive wheels, which is provided with a wheel which is freely rotatable about a vertical centre line and which can serve as a guide means when moving around an obstacle, after the device has abutted same. By means of an ultrasonic sensor a trajectory parallel to a longitudinal wall of a passageway is followed, the wheel being used to remain in contact with the wall for guiding the device in a trajectory along the wall. In order to continue to follow the wall in a proper manner, there is put more power on the drive wheel that is farthest from the wall than on the other drive wheel. As a result thereof, the accumulator is overloaded, which affects the maximum duration of the active period of time of the device.

It is an object of the invention to provide an unmanned self-propelled and self-steering device, by means of which it is possible to follow a wall in an energy-saving manner.

In one embodiment, the invention provides for this purpose an unmanned self-propelled and self-steering device for removing manure present on a floor, comprising a manure slide and a drive for moving the device over the floor, comprising a frame, wherein the drive comprises two individually drivable drive wheels which are arranged parallel on the frame, and a control unit for the drive, wherein the device is provided with at least one force meter which is functionally connected to at least one first and a second contact surface, which are each at least partially oriented laterally, in opposite directions, wherein the force meter is functionally connected to the control unit, wherein the control unit is configured to control the drive in such a manner that the contact surface remains in contact with a wall and the force meter indicates, for the force exerted on that contact surface, a value which is within a preset range about a reference value.

By means of this device it is possible to follow one arbitrary wall of two walls located on both sides of a passageway. Then, both contact surfaces, respectively, can ensure the supply of a signal to the control unit, which signals are opposite in sign. If the measured value is above the range which, in one embodiment, can be small, can even approach zero, the control unit will put more power on the drive wheel that is closest to the wall and, in the opposite case, will put more power on the other drive wheel, all this until the measured value has re-entered the range. The reference value can be the zero value in unloaded condition, thus without contact with the wall. The said range can be attuned to the lowest workable value(s), thus to avoid unnecessary loss of power. It is additionally observed that, as a result of changes which occur after some time, such as by a change in temperature, by small plastical deformations of the contact surface or parts connected thereto, for example after an impact with an animal, and by contamination, the reference value or zero value can expire. The set range follows that change.

It is observed that having a wall followed by a robot by means of a force sensor is known per se from DE 44 25 924, which is incorporated by reference in its entirety, in which document an articulated arm is disposed on a self-propelled trolley, on which arm an implement, such as a sucking nozzle, is mounted and on which arm a force sensor is disposed.

Furthermore, U.S. Pat. No. 5,309,592, which is hereby incorporated by reference in its entirety, discloses a self-propelled, unmanned robot whose main frame is provided at the front with an auxiliary frame on which brushes are disposed. The main frame is driven by two drive wheels disposed on both sides, with individually operable wheel motors. By means of a slide motor, the auxiliary frame is displaceable in transverse direction with respect to the main frame. The auxiliary frame is provided at one side with a roller of a force sensor which is able to measure in two directions which are perpendicular to each other. The two wheel motors and the slide motor are controlled by a control unit. When a difference is detected between the forces in both directions of measurement, the control unit controls the two wheel motors until they are equal again and the direction of travel is parallel to the wall. When the resultant calculated from the two forces measured differs from the preset target force, the slide motor is operated to make them equal to each other again, in which case the brushes, too, are displaced in transverse direction with respect to the main frame with the wheels.

In another embodiment, the invention provides an unmanned self-propelled and self-steering device for removing manure present on a floor, comprising a manure slide and a drive for moving the device over the floor, comprising a frame, wherein the drive comprises two individually drivable drive wheels which are arranged parallel on the frame, and a control unit for the drive, wherein the device is provided with at least one force meter which is functionally connected to at least one, at least partially laterally oriented contact surface which is provided on a holder which is fastened to the frame separately from the manure slide, wherein the force meter is functionally connected to the control unit, wherein the control unit is configured to control the drive in such a manner that the contact surface remains in contact with a wall and the force meter indicates, for the force exerted on that contact surface, a value which is within a set range.

The device can further be provided with at least one third contact surface which is at least partially oriented forwardly and functionally connected to a force meter which is functionally connected to the control unit, in particular functionally connected to the same force meter as the first and second contact surfaces. It is possible to detect hereby contact with an animal or other obstacle, whereafter the drive can be controlled there in a direction which avoids prolonged contact with the animal or other obstacle. For recognition it is possible to use the circumstance that the signal from the third contact surface forms a superposition on the signal from the first or second contact surface.

In a further embodiment, all contact surfaces are provided on one and the same holder. In this case, the force meter can form a connection of the holder with the frame, preferably at a position in or near a central longitudinal plane of the device. Displacement of the holder is converted into an electric signal. The holder can have the shape of a bumper member which is connected to the frame via the force meter. The bumper member itself can form the contact surfaces.

In one embodiment, at a distance from the force meter, in particular at a distance in forward direction, the bumper member is connected to the frame additionally and movably, in particular rotatably, so that the moment generated on one side of a central longitudinal plane of the device, by contacting an object located forwardly with respect to the device, such as a leg of a cow, supplies the same sign as contacting a side wall. The movable connection is then preferably located forwardly with respect to the first and second contact surfaces.

In this case, the manure slide is able to determine a manure-accommodating-space which opens in forward direction, wherein the bumper member is located at the open side of the manure-accommodating-space.

The bumper member can be located in a trajectory in front of the manure-accommodating-space at a distance from the floor and be provided, at the lateral sides of the device, with depending bumper portions, which preferably also form the first and second contact surfaces. The depending bumper portions enable the device to follow by means of the contact surfaces an upright edge which forms the usual, relatively low threshold between a passageway and a series of cubicles.

It is observed that EP 0.943.235, which is hereby incorporated by reference in its entirety, shows an unmanned self-propelled and self-steering manure slide with a straight slide disposed at its front and position-determining means. At the front and the rear, there is also provided a sensor for detecting an obstacle, such as an animal or a person. It is not described what is being done with the signal.

NL 1011350, which is hereby incorporated by reference in its entirety, shows a trolley with manure slide, provided with a brush by means of which manure is swept into a bin. The trolley is provided with a sensor for monitoring fixed guide means. There is additionally provided a contact section which ensures that the trolley stops when coming into contact with an obstacle.

EP 1.371.285, which is hereby incorporated by reference in its entirety, describes facilities for protecting the trolley from obstacles, such as cows. These can have the shape of a bumper or a detector. They can also comprise wall-following means.

It is further observed that DE 20 2007 014 840, which is hereby incorporated by reference in its entirety, shows an unmanned self-propelled and self-steering trolley with manure slide having a transverse slide at its front and two obliquely oriented sub-slides therebehind. Arms carrying a free roller at their ends are pivotally mounted to the outer ends of the sub-slides. The arm is pretensioned to an outward position. In the case of (undesired) contact with a wall, the arm is pushed inwardly. At the inner side of the pin there is located a sensor plate which rotates along with the arm in order to come into the range of a proximity switch. When this is the case, the switch activates the control unit to control the drive of the trolley in such a manner that the trolley moves away from the side where the arm in question has come into contact with a wall.

When an obstacle is contacted frontally, the transverse slide is pushed against spring force in order to come with inward protrusions disposed near the lateral edges of the transverse slide into the range of associated proximity switches. The spring pressure and/or the position of the switch is settable so as to be above a threshold value which is representative of a collision with a stationary obstacle. The switch activates the control unit which controls the drive of the trolley in such a manner that the trolley rotates away over 90 degrees to the side where the roller is located that did not make contact with the side wall.

In this known device, in the case of impact, the drive is controlled in dependence on whether or not the switch is activated.

It is observed that DE 10 2007 020 328, which is incorporated by reference in its entirety, shows an unmanned self-propelled and self-steering manure-displacing device which can be provided with a force sensor which is designed as a pressure sensor, by which the force with which the device presses against an obstacle, such as an animal or a box, is detected. At a very low speed, contact with an animal is effected and, subsequently, with increasing drive force, an increasing pressure is exerted on the animal in order to induce the animal to go away. When a maximum pressure is achieved, which is an indication that the animal may be ill or that an object, such as a box, is involved, there is made a switch to a rearward movement, away from the animal or the box, and subsequently to a bypassing movement.

In accordance with various aspects of the present invention, an unmanned self-propelled and self-steering device for displacing material present on a floor, comprising a frame with a material-displacing device and a drive for moving the device over the floor is provided. In one embodiment, the drive comprises two individually drivable drive wheels which are arranged parallel on the frame, and a control unit for the drive, wherein the device is provided with at least one force meter which is functionally connected to at least one, at least partially laterally oriented contact surface, and the force meter is functionally connected to the control unit. The control unit is configured to control the drive in such a manner that the contact surface remains in contact with a wall and the force meter indicates, for the force exerted on that contact surface, a value which is within a set range. One of ordinary skill in the art will appreciate that the functional connection between the contact surface and the force meter may be made by any means to transmit force to the force meter, such as a physical connection via a hinge or fastening, and the functional connection between the force meter and the control unit may be made by any means to transmit a signal to the control unit, such as an electrical wired or wireless connection and the like.

In another embodiment, the device for carrying out activities on a stable floor is provided with a frame which is provided with propelling means and is in particular unmanned, self-propelled and self-steering, wherein the device is further provided with an implement which is moved along with the frame, wherein the device is further provided with one or more protrusions which are fixed thereto and which define outer contact surfaces of the device and are capable of bending when abutting an external body. This makes it possible to draw the attention of an animal which is in the movement path of the device by means of a relatively soft contact to the fact that the device is approaching, whereafter the animal is enabled to step aside before it is hit by the subsequent fixed, harder parts of the device.

The bendability is enhanced if the protrusions, which can be made of bendable material, for example of polyurethane, are finger-shaped.

The protrusions extend preferably substantially in forward direction from the front side of the device, and/or substantially horizontally, in particular from locations near a centre of the device, preferably at a distance of more than approximately 0.1 m above the floor.

In one embodiment, the implement is a manure slide with an entrance area located in front thereof, wherein the protrusions are located at a distance above the manure slide, in particular straight above the entrance area.

Advantageously, the protrusions can form part of a hood for screening a sensor on the device.

It is observed that an autonomous device with a manure slide, which manure slide is provided on both sides with star wheels which are provided with rubber flaps and which are freely rotatably about a vertical axis, is known per se.

In accordance with various aspects of the present invention, an unmanned self-propelled and self-steering device for removing manure present on a floor is provided, the device comprising a manure slide and a drive for moving the device over the floor, wherein the manure slide is substantially U-shaped or V-shaped with two legs in order to define a manure-accommodating-space which opens in forward direction and is closed in rearward direction, wherein the manure slide itself is provided on its upper side with a grid-shaped safety screening. It is prevented hereby in a simple manner that the cattle will have one leg in the accommodation space. The safety screening may be experienced by the cattle as an unpleasant support, as a result of which the cattle will move away from the device. The grid forms a screening which may have less weight than a closed screening and offers additionally less surface on which dirt (manure) can be deposited.

The invention furthermore provides an assembly of a device according to the invention and a floor. The floor can have a closed upper surface and/or can form a passageway in a stable.

One of ordinary skill in the art will appreciate that what is meant by unmanned self-propelled and self-steering device are both at least substantially autonomously travelling and steering devices, whether or not programmed for this purpose, such as the Discovery (registered trademark) manure slide of the registered trademark Lely, and devices in which the travelling and/or steering are/is remotely controlled. In both cases, a motor for the travelling of the device is provided in the device.

BRIEF DESCRIPTION OF THE DRAWINGS

The features and advantages of the invention will be appreciated upon reference to the following drawings, in which:

FIGS. 1A and 1B show a top and a side view, respectively, of one embodiment of a device according to the invention;

FIGS. 2A and 2B show a top and a side view, respectively, of one embodiment of a device according to the invention;

FIGS. 3A and 3B show a top and a side view, respectively, of one embodiment of a device according to the invention;

FIGS. 4A and 4B show a top and a side view, respectively, of one embodiment of a device according to the invention;

DESCRIPTION OF ILLUSTRATIVE EMBODIMENTS

Figure 4B:
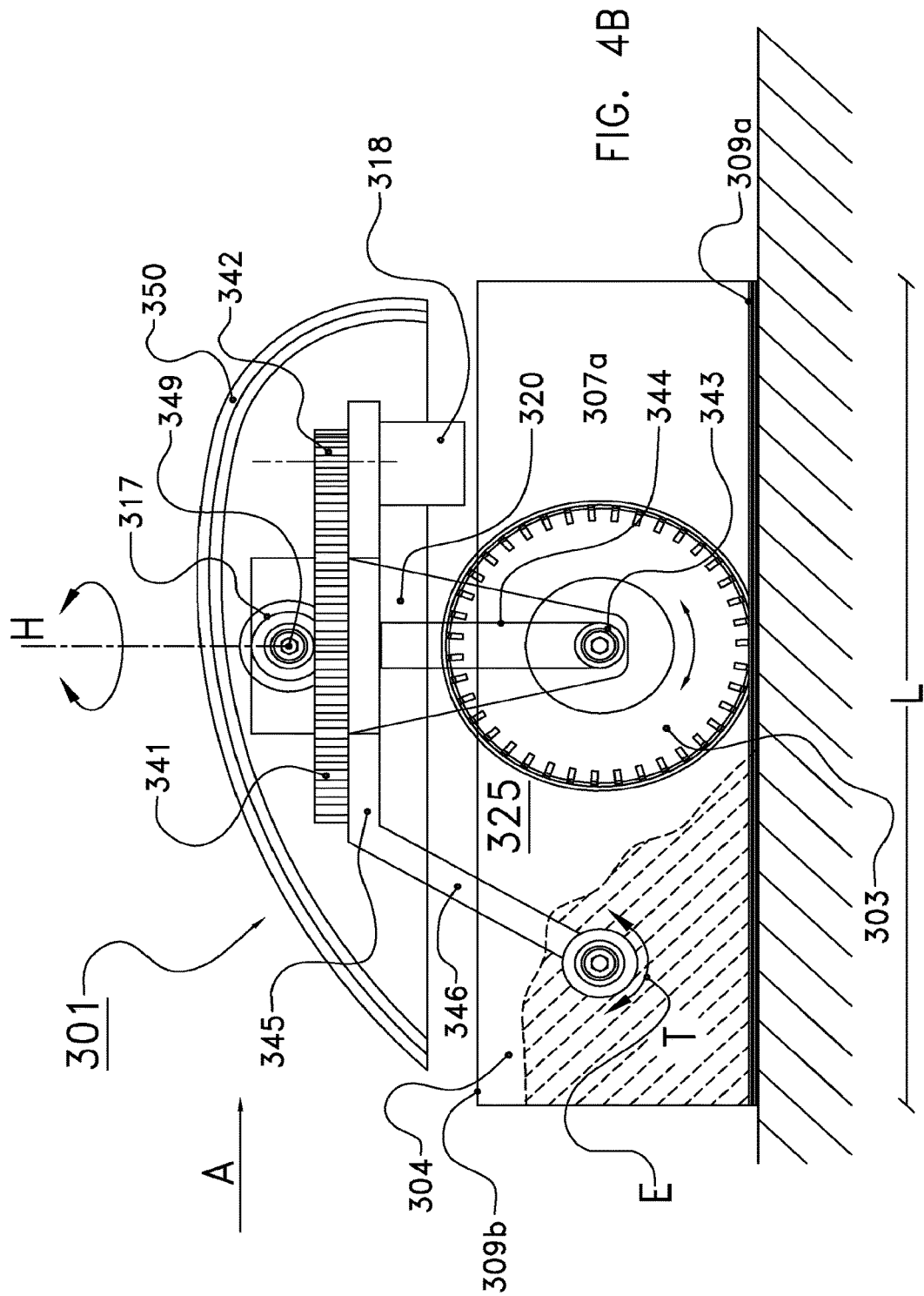

The following is a description of certain embodiments of the invention, given by way of example only and with reference to the drawings. The device 1 shown in FIGS. 1A and 1B for removing manure from a floor 30 of a passageway of a stable comprises a relatively heavy, block-shaped concrete housing 2. The device 1 is supported on two drive wheels 3 and one or more caster wheels 3' and on a manure slide or scraper 4. The housing 2 is provided on both sides with current collectors 6, by means of an accumulator 35, included in the housing 2, can be charged at an external charging station, as used in the manure slide device which is offered by Lely (registered trademark) under the name Discovery (registered trademark). The manure slide 4 is wholly located in front of the housing 2 and thus in front of the drive, as is visible in FIGS. 1A and 1B, and viewed in projection on a central longitudinal plane M of the device 1.

The housing 2 accommodates a control unit 15 which is fed by the accumulator and which controls, via the control line 18, a double electric motor 17, by means of which the wheels 3 can be driven individually. The control unit 15 is capable of being programmed remotely, so that the device 1 can follow autonomously a certain working route, in a repeating manner.

At the location of 21, the manure slide 4 is mounted on a rigid longitudinal girder 10 which extends forwardly from the housing 2 and is fastened thereto in a rigid manner. At the front end of the longitudinal girder 10, there is mounted a force meter or load cell 11, located in the central longitudinal plane M, to which is fastened a bumper 12 which is located at a distance above the floor and which screens the manure slide 4 in forward direction and whose ends 12a and 12*b* extend laterally outside the manure slide 4. The ends 12*a,b* are displaceable with respect to the legs 7*a,b*. The load cell 11 supplies signals to the control unit 15 via the line 16. It is visible that the manure slide 4 is connected to the longitudinal girder 10 in a manner in which it is parallel to the bumper with load cell.

The manure slide 4 is made of stainless steel and U-shaped with two legs 7*a,b* and rear wall 8, which define a manure-accommodating-space 25, with a length L1 and a width B, which are substantially equal in this example. The legs 7*a,b* and the rear wall 8 are plate-shaped, the height of the legs 7*a,b* being greater at the rear than at the front. At their lower edge 9*a* they are provided with a polyurethane strip 26, for a sweeping and/or scraping contact with the floor 30. At the upper edges 9*b* of the legs 7*a,b* there are mounted cross-bars 5, at a mutual distance s from each other which is smaller than the diameter of a hoof of the cattle, so that there is formed above the manure-accommodating-space 25 a grid which is not permeable for the hoofs of the cattle. The cross-bars 5 keep the legs 7*a,b* at a constant distance from each other but, like the rear wall 8, permit some mutual upward/downward movement (direction C) of the legs 7*a,b*, so that the lower edges thereof are able to follow the floor 30 in a proper manner.

During operation on a so-called closed floor 30 of the passageway of a stable, it is possible by means of the device 1 moving in forward direction A to move in an autonomous manner manure present on the floor 30 to a manure pit opening 32 located at the end 31 of the passageway. Owing to the fact that the floor 30 has no slots, the manure usually heaps up in front of the manure slide. When a certain amount has been exceeded, it will be possible for the manure to escape sideways. This problem is solved by designing the manure slide 4 also as an accommodation space for, in this example, all manure that is encountered in one stroke over the passageway. All this manure T heaps up against the rear wall 8, where the legs 7*a,b* have the greatest height, and is taken along in the accommodation space 25 to the opening 32, onto which the device moves until the caster wheel 3' has come at the edge of the opening 32 and the rear wall has come above the opening 32. It is thus possible to deliver all the manure present in the accommodation space 25. The device 1 subsequently moves back to the other end of the passageway, to start a next stroke, for sweeping a strip of the floor 30 next to the strip that was swept in the previous stroke. If the opening 32 is covered by a steel grid, the manure slide 4 can be supported thereon and the caster wheel 3' can be omitted.

By way of example, L1 is greater than L2, the length of the housing 2 up to the wall 8. L1 can amount to more than ⅔ of the sum of L1+L2, the overall length L of the device 1. L1 and B can, for example, amount to 1 meter (m), whereby an amount of manure of 1001 can be accommodated without problems, which amount of manure is expected to land, in one hour, on a strip of 1 m of a passageway with a length of 100 m and a width of, for example, 3 m. In that case, the device 1 has to clean the same surface only 1× per hour. Then, L2 can amount to 0.5 m.

By means of a ultrasonic sensor 36 on the device 1, the signal of which is supplied to the control unit 15, the device 1 follows the subsequent, programmed paths on the passageway at a distance from a passageway side wall detected by the sensor. By means of the load cell 11 and the bumper 12, the side wall can additionally be followed, as a guide means. When, owing to the condition of the floor 30, the device tends more towards the wall, the bumper end or contacting surface 12*a* or 12*b* which makes contact with the wall will experience an increased force Fa or Fb, which force causes a moment Ma or Mb and is absorbed in the load cell 11 and transmitted as a signal to the control unit 15. If the force Fa or Fb exceeds a value which has been pre-programmed in the control unit, the motor unit 17, in dependence on the extent to which the value is exceeded, is controlled in such a manner that the end 12*a* or 12*b* which makes contact is moved away from the wall to some extent, in order to reduce the force experienced from the wall. In a comparable, inversed manner a tendency to move away from the wall can be corrected. Only little difference in power on the two motors 17 is required in this case.

FIGS. 2A and 2B show an alternative device 101, provided with a relatively heavy, block-shaped concrete housing 102 which is supported on two wheels 103 and with a manure slide 104. The energy supply is comparable to that of the device 1 of FIGS. 1A and 1B.

The housing 102, like the device 1, accommodates a control unit 115 which is fed by an accumulator and which controls a double electric motor 117 by which the wheels 103 can be driven individually. The wheels 103 are fastened to brackets 120 which extend downwardly from the housing 102, on both sides thereof, and which are fastened to the housing 102, which brackets also accommodate a drive belt 144 driven by a pulley 119 which is driven by the electric motor 117. The control unit 115 is capable of being programmed remotely, so that the device 101 can follow autonomously a certain working route, in a repeating manner.

The manure slide 104 is suspended from the housing 102 and comprises leg portions 107*a,b* which merge, via transverse walls 108*a,b*, into leg portions 107*c,d* which end in rear wall 108*c*, 208. The manure-accommodating-space 125 for the manure T, formed by the leg portions 107*a-d* and the walls 108*a-c*, comprising a wide front portion 125*a* and a narrower rear portion 125*b*, thus extends from the rear of the device 101 to the front thereof. When viewed in projection on a central longitudinal plane M of the device 101, the drive of the device coincides with the accommodation space 125 in horizontal sense.

The brackets 120 extend along the outer side of the leg portions 107*c,d*. Two cross-bars 126,*b* ensure a cross bracing between the two leg portions 107*a,b*. In order to prevent animals from advancing into the accommodation space 125 with their hoofs, longitudinal bars 105 are mounted between the cross-bars 126*a,b*, again with said mutual distance s. Also in this case, the leg portions 107*a,b* are able to move upwards and downwards to some extent with respect to each other or able to deform, direction C.

This embodiment of the device according to the invention can be more compact than that of FIGS. 1A and 1B, but by the sideward positioning of the wheels 103 beside the rear part 125*b* of the accommodation space 125, it is not possible to discharge the whole amount of accommodated manure in one action into the opening 32 of the manure pit.

As regards the design of the housing 202 and the accommodation space 225, the device 201 depicted in FIGS. 3A and 3B resembles to a large extent to that of FIGS. 1A and 1B, such as the wheels 203, rear wall of manure accommodating place 208, control unit 215, and the double electric motor 217. However, in this case, the connection of the manure slide 204 with the housing 202 is different, i.e. in the form of a sort of cardanic connection. A longitudinal bar 210, which is bearing-supported in a freely rotatable manner about its centre line, extends forwardly direction D from the housing 202. At the front end of the bar 210 there is mounted a bracket 223 in which a cross-bar 222 is bearing-supported in a freely rotatable manner, direction E. The ends 222*a,b* of the cross-bar 222 are rigidly attached to legs 207*a,b* of the manure slide 204. As a result of this connection with the housing 202 it is possible for the manure slide 204 to follow in a proper manner slopes in longitudinal and transverse direction of the floor 30, so that the contact of the manure slide 204 with the wall remains sufficient. The rotational centre lines for the longitudinal bar 210 and for the cross-bar 222 are located below the highest point of the upper edge 209*a*, the rotational centre line for the cross-bar 222 even below the entire upper edge 209*a*, which facilitates the prevention of manure leakage during scraping.

The device 301 depicted in FIGS. 4A and 4B is very compact, wherein the outer dimensions are defined by the manure slide 304, L.B. The device 301 is supported only on the U-shaped manure slide 304 and the single wheel 303. At a location behind the wheel 303, the legs 307*a,b* are attached in a freely rotatable manner (direction E) to the ends 322*a,b* of a cross-bar 322. The cross-bar 322 itself is bearing-supported in a freely rotatable manner, at a location below the upper edge 309*b* of the legs 307*a,b*, at the lower end of a downwardly and rearwardly extending rigid strip 346 which is fixed to a horizontal frame plate 345. A gearwheel 341 is supported on the frame plate 345 in a manner in which it is rotatable about a vertical centre line (direction H). The gearwheel 341 engages pinion 342 which is driven by electric motor 318. The gearwheel 341 is provided with an electric motor 317 which drives a pulley 349 and thereby a belt 344 by which a pulley 343, which is rotationally fixed with the single, central wheel 303, is driven, in the desired direction. The wheel 303 is mounted, in a manner in which it is rotatable about a horizontal centre line, in a fork 320 which forms a unit, rotatable about a vertical centre line (direction H), with the gearwheel 341. The drive and the manure-accommodating-space 325 are upwardly screened by a hood 350.

During operation, when the device 301, like the device 1 of FIGS. 1A and 1B is travelling and steering in an autonomous manner, manure will be accommodated in the accommodation space 325 which is defined by the legs 307*a,b* and rear wall 308. By means of the rotational connection at the location of the bar ends 322*a,b*, the manure slide 304 is able to properly follow the floor 30 in direction A. In this case it is advantageous that the point of rotation is located below the upper edge of the manure slide 304. By means of the electric motor 318 the wheel can be rotated in order to steer the device 301. The electric motors 317 and 318 can be controlled by a control unit 319, as described in the foregoing.

Due to the position of the drive wheel 303, 403 in front of the rear wall 308 of the manure slide, that wall will be urged against the floor to a greater extent when the device 301, 401 accelerates, so that the slide function is enhanced.

It is observed that the legs 7*a,b* etcetera may, instead of being straight, be slightly curved or bent in order to prevent them from getting into a longitudinal slot in the floor 30, for example a longitudinal slot which was formerly used for guiding a beam-shaped manure slide extending over the overall width of the passageway.

In the manure slide device of FIGS. 1A and 1B, a contact with, for example, a left side wall will cause a force Fb, the moment Mb of which is directed clockwise. However, if at the same side of the plane M an obstacle, such as a leg of a cow, is contacted, the force Fk exerted thereby on the bumper results in a moment Mk which is directed anti-clockwise. The electric signals generated by the load cell in response to said forces Fb and Fk will then mutually be opposite in sign, so that the control unit 15 will steer/correct in the one case (wall) in a manner different from that in the other case (cow), despite of the fact that the objects in question are located on the same side. In order to remedy this, in the device 401 of FIGS. 5A and 5B, there is provided, by means of a deformable connection 413, such as a hinge, a bumper 412 at the front end of longitudinal girder 410 of the chassis. The connection 413, like the load cell 411, is located in or near the central longitudinal plane of the device 401. The bumper 412 forms an almost circumferential body, having at the front contact surfaces 412*c,d* and at its lateral sides contact surfaces 412*a,b*. The portions 412*e,f* located behind the portions 412*c,d* end on the load cell 411 which is attached to the longitudinal girder 410. If the side wall 31 or the cow K is now contacted, this results in a moment Mb or Mk with an equal sign, so that the load cell 411 supplies signals having the same sign to the control unit 415 located inside the housing 402.

Figures 5A, 5B:
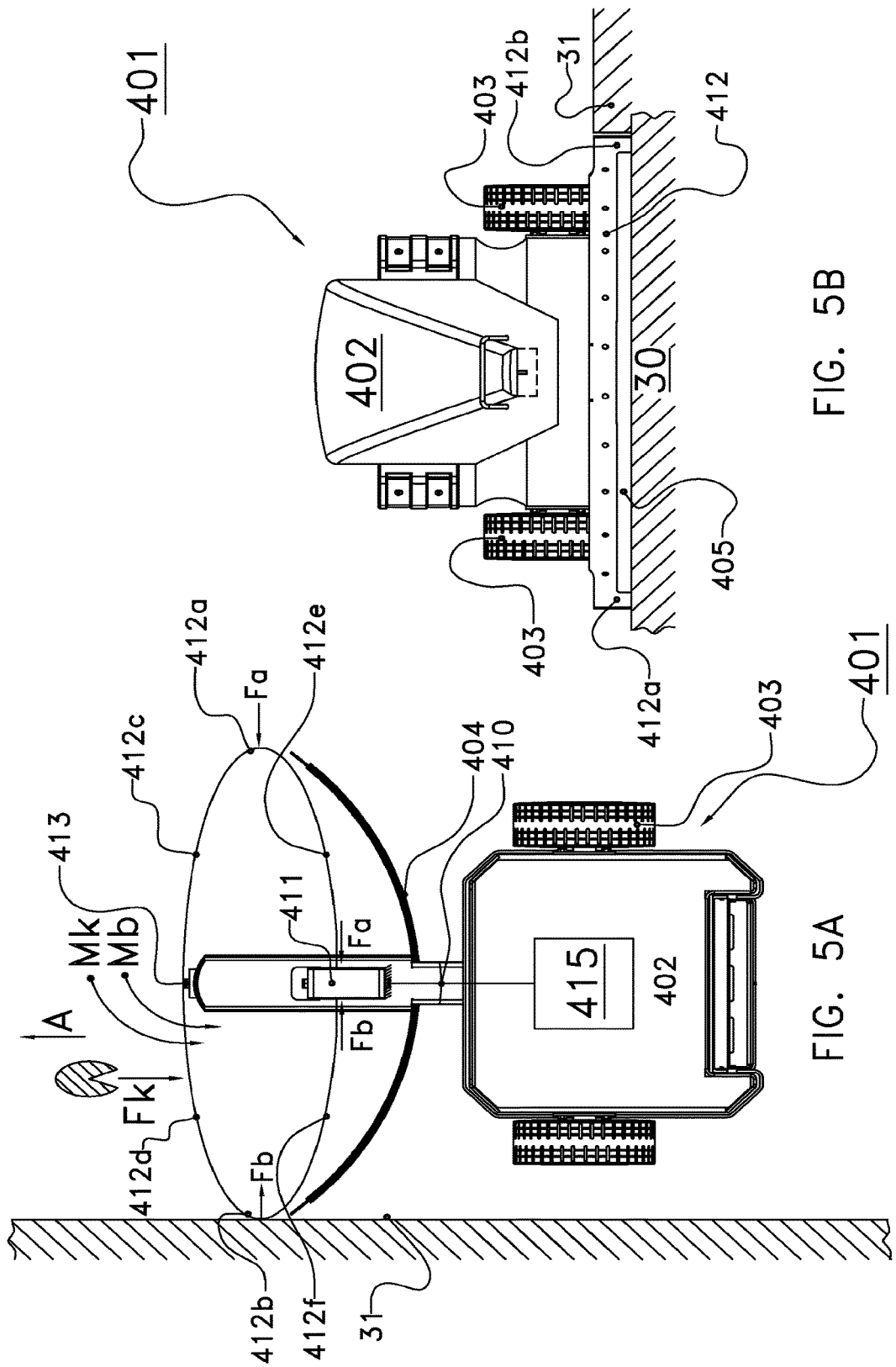
FIGS. 5A and 5B show a top and a front view, respectively, of one embodiment of a device according to the invention.

The front view of FIG. 5B shows that the bumper 412 is located in the area in front of the manure slide 404 at a distance from the floor 30, for passage of the manure 405 on the floor 30. At the sides, the contact surfaces 412*a,b* are in a lowered position, so that they are able to follow the upright edge between a passageway and a series of parallel cubicles.

Figure 6:
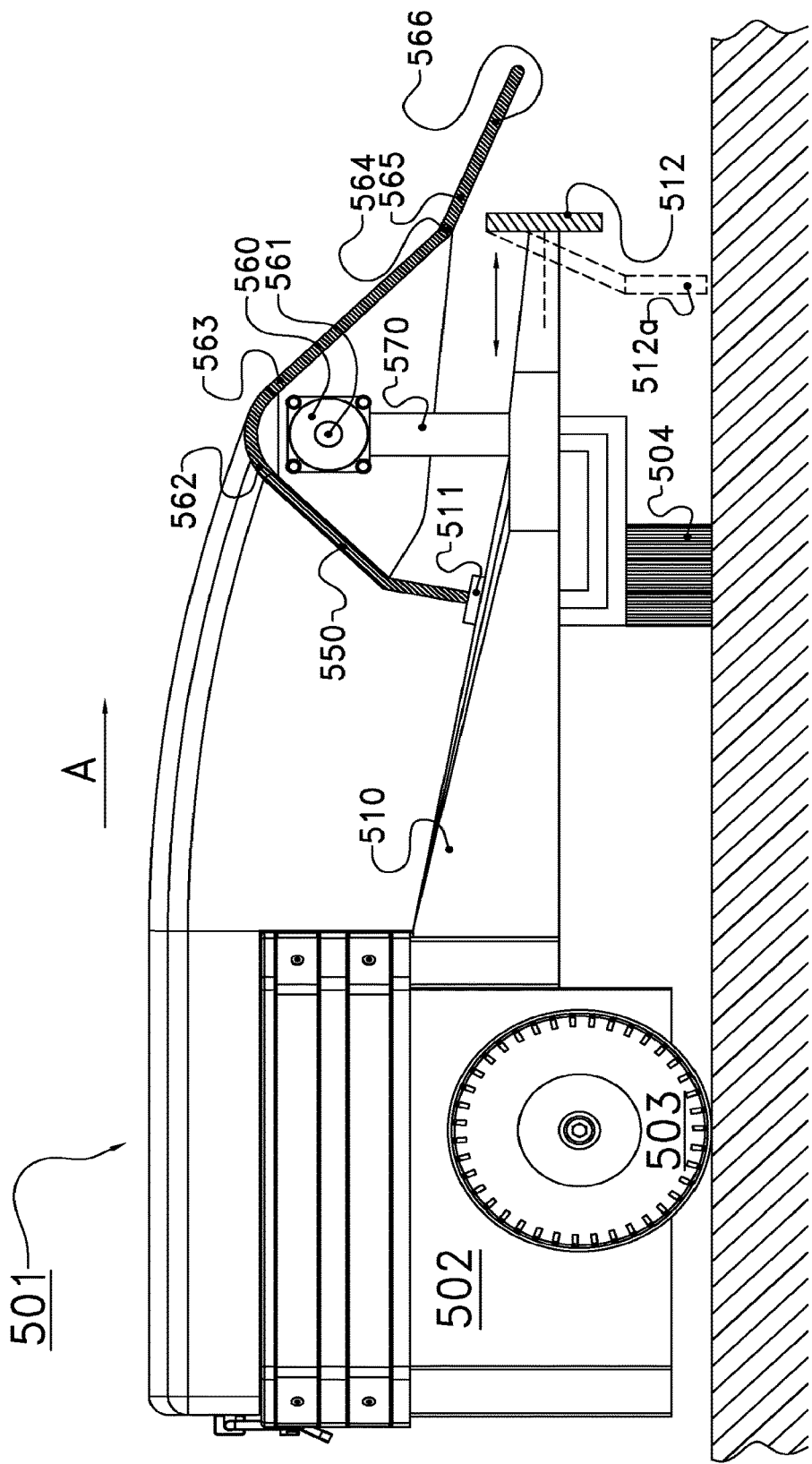
FIG. 6 shows a side view of one embodiment of a device according to the invention.

FIG. 6 shows a manure slide device 501 with a housing 502 and wheel 503, having a longitudinal girder 510 which is provided with a manure slide 504 and, at its front end, a bumper 512. On the longitudinal girder 510 there is also mounted a holder 570 for ultrasonic sensors 560, each of which having their membrane 561 oriented laterally, opposite to each other. In order to prevent contamination of the membranes 561, a tunnel-shaped hood 550 of rubber-like material, for example PUR rubber, is mounted, via steel strip 511, on the longitudinal girder 510.

The hood 550 comprises a rear wall 562 and a front wall 563 which merges at its lower end, via curve 564, in a series of fingers 565 of the same material. The fingers 565 are thus as it were fixed to the device 501, in a manner different from that in which they are freely rotatable. The fingers 565 extend slightly downwards and their ends 566 extend in front of the bumper 512 in order to be able to come into contact in an animal-friendly manner with a cow which has not noticed the device 501 approaching in the direction A.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An unmanned self-propelled and self-steering device for removing manure present on a floor, comprising:
   a manure slide, wherein the manure slide has an upper edge;
   a drive for moving the device over the floor; and
   a frame provided with the drive, wherein the manure slide is held by the frame by a connection structure,
   wherein the manure slide defines autonomously a manure-accommodating-space, the manure-accommodating-space being open in a forward direction and closed in a rearward direction, wherein the manure slide is substantially U-shaped or V-shaped with two legs having a length substantially the same as a width of the manure slide, wherein the drive comprises two drive members located at lateral sides of the device, and wherein the manure-accommodating-space extends up to between the two drive members, wherein the connection structure comprises a first rotational connection with a first, substantially horizontal rotational centre line located below at least a portion of the upper edge of a manure-pushing wall portion of the manure slide, and wherein the connection structure comprises a second rotational connection with a second, substantially horizontal rotational centre line at an angle to the first rotational centre line.

2. The device according to claim 1, the two legs of the manure slide have a length greater than half of the overall length of the device.

3. The device according to claim 1, wherein a largest dimension of the manure-accommodating-space in a longitudinal direction of the device amounts to the order of magnitude of the width of the manure slide.

4. The device according to claim 1, wherein ends of the two legs of the manure slide extend to at least near the front of the device.

5. The device according to claim 1, wherein, when viewed in projection on a vertical central longitudinal plane of the device, and on a vertical plane transverse thereto, the drive completely coincides in a horizontal direction with the manure-accommodating-space.

6. The device according to claim 1, wherein the manure-accommodating-space extends in a rearward direction to a rear side of the device.

7. The device according to claim 1, wherein the drive is located completely behind the manure slide.

8. The device according to claim 1, wherein the second rotational centre line is located below said at least a portion of the upper edge of the manure-pushing wall portion of the manure slide.

9. The device according to claim 8, wherein the first rotational centre line is substantially transverse to a vertical central longitudinal plane of the device, is located in front of a rear wall of the manure-accommodating-space, and coincides in a horizontal direction with the manure-accommodating-space, when viewed in projection on a vertical central longitudinal plane of the device.

10. The device according to claim 1, wherein the angle amounts to approximately 90 degrees.

11. The device according to claim 1, wherein the second rotational centre line is located in a vertical central longitudinal plane of the device.

12. The device according to claim 1, wherein the legs of the manure slide are plate-shaped and the manure slide is provided with a mechanism configured to enable a mutual rotation of at least a portion of the lower edges of the legs in a vertical plane in which said at least a portion of the lower edges of the legs is located.

13. The device according to claim 12, wherein the legs of the manure slide are deformable in their plane.

14. The device according to claim 13, wherein the legs of the manure slide are connected to the rest of the manure slide by an internal hinge.

15. The device according to claim 12, wherein the manure slide comprises a rear wall, the rear wall being deformable about a centre line transverse to a central longitudinal plane of the manure slide.

16. The device according to claim 1, wherein the drive comprises two individually drivable drive wheels arranged parallel on the frame, and a control unit for the drive, wherein the device is provided with at least one force meter functionally connected to at least one first and a second contact surface, which are each at least partially oriented laterally, in opposite directions, wherein the force meter is functionally connected to the control unit, and wherein the control unit is configured to control the drive in such a manner that the contact surface remains in contact with a wall and the force meter indicates, for the force exerted on that contact surface, a value which is within a preset range about a reference value.

17. The device according to claim 16, further provided with at least one third contact surface at least partially oriented forwardly and functionally connected to a force meter which is functionally connected to the control unit.

18. The device according to claim 15, wherein the contact surfaces are provided on a holder fastened to the frame separately from the manure slide, wherein the holder is connected to the frame via the force meter, in or near a central longitudinal plane of the device.

19. The device according to claim 18, wherein the holder is designed as a bumper member, the bumper member forming the contact surfaces.

20. The device according to claim 19, wherein the bumper member extends at the open side of the manure-accommodating-space.

21. The device according to claim 20, wherein the bumper member is located in a trajectory in front of the manure-accommodating-space at a distance from the floor and is provided, at lateral sides of the device, with depending bumper portions, which also form the first and second contact surfaces.

22. The device according to claim 18, wherein at a distance in a forward direction from the force meter, the holder is connected to the frame additionally and movably.

23. The device according to claim 22, wherein the movable connection is located forwardly with respect to the first and second contact surfaces.

* * * * *